United States Patent [19]

Lövgren

[11] Patent Number: 4,783,190
[45] Date of Patent: Nov. 8, 1988

[54] APPARATUS FOR TRANSFERRING LOAD UNITS BETWEEN TWO CARRIERS

[76] Inventor: Sten Lövgren, Svanholmsvägen 10, S-182 75 Stocksund, Sweden

[21] Appl. No.: 801,155
[22] PCT Filed: Feb. 13, 1985
[86] PCT No.: PCT/SE85/00072
 § 371 Date: Oct. 19, 1985
 § 102(e) Date: Oct. 19, 1985
[87] PCT Pub. No.: WO85/03692
 PCT Pub. Date: Aug. 29, 1985

[30] Foreign Application Priority Data

Feb. 21, 1984 [SE] Sweden ................................ 8400932

[51] Int. Cl.⁴ .............................................. B65G 63/02
[52] U.S. Cl. .................................... 414/347; 414/401
[58] Field of Search .............. 414/340, 341, 343, 345, 414/347, 352, 391, 392, 396, 399, 401, 660–663

[56] References Cited

U.S. PATENT DOCUMENTS

| | | | |
|---|---|---|---|
| 1,306,158 | 6/1919 | Walker | 414/347 |
| 1,830,740 | 11/1931 | Leech et al. | 414/396 |
| 2,004,095 | 6/1935 | Hankins et al. | 414/345 |
| 2,512,798 | 6/1950 | Hodges | 414/341 |
| 2,828,027 | 3/1958 | Stevenson et al. | 414/347 X |
| 2,926,797 | 3/1960 | Decker | 414/347 |
| 3,357,582 | 12/1967 | Wittek | 414/347 X |
| 3,916,799 | 11/1975 | Smith | 414/352 X |
| 4,208,160 | 6/1980 | Lövgren | 414/347 |

Primary Examiner—Joseph E. Valenza
Assistant Examiner—David A. Bucci
Attorney, Agent, or Firm—Gifford, Groh, VanOphem, Sheridan, Sprinkle and Dolgorukov

[57] ABSTRACT

An apparatus for transferring load units between two carriers having at least one transferring device movable between the carriers, the transferring device being adapted to carry the load unit during the transfer, and a bridging device being movable in order to bridge the gap between the carriers. The bridging device forms a part of a support path device for supporting the transferring device during its movement and has support path portions, which, when the bridging device is moved into a bridging position, are located in overlapping relation, in the direction of movement of the transferring device, to further support path portions, which are arranged on the first carrier, while forming a path supporting the transferring device during substantially the entire movement from the first carrier to the second carrier.

6 Claims, 4 Drawing Sheets

APPARATUS FOR TRANSFERRING LOAD UNITS BETWEEN TWO CARRIERS

BACKGROUND OF THE INVENTION

1. Field of the Invention

This invention relates to an apparatus for transferring load units between two carriers and more particularly to a bridging device.

2. Description of the Prior Art

Such an apparatus is described in U.S. Pat. No. 1,830,740. There a bridging device is described having two first support path portions which extend inside, parallel with and on substantially the same level as the two other support path portions. This requires cross bars that must be arranged between the support path portions in order to make them stable against movement in the horizontal plane. As a result, the power means for moving the transferring means from one carrier to the other cannot be disposed on a lower level than said support path portions without the disposition of these portions on a level lying high with respect to the bottom of the load carrier. From this it follows that the apparatus becomes very bulky and a great part of the vertical clearance otherwise being free for the load is lost.

SUMMARY OF THE INVENTION

The object of this invention is to overcome the disadvantages discussed above.

In accordance with the invention, this object is obtained by an apparatus for transferring load units between two carriers having at least one transferring device movable between the carriers, the transferring device being adapted to carry the load unit during the transfer, and a bridging device being movable in order to bridge the gap between the carriers. The bridging device forms a part of a support path device for supporting the transferring device during its movement and comprises support path portions, which, when the bridging device is moved into a bridging position, is located in overlapping relation, in the direction of movement of the transferring device, to further support path portions, which are arranged on the first carrier, while forming a path supporting the transferring device during substantially the entire movement from the first carrier to the second carrier. Thus, no cross bars are needed between the male members in order to attain stability against lateral movement of these members. An increased stability of the apparatus is also achieved in that the support path portions of the bridging device are composed of two parts, each of which is displaceably movable on an underlayer part on the first carrier. Power means for the transferring of the transferring device is positioned in the channel so established between the male members, without causing the apparatus to be unnecessary high. The simplicity of the apparatus according to the invention permits a very inexpensive construction.

BRIEF DESCRIPTION OF THE DRAWINGS

With reference to the appended drawings, below follows a specific description of an embodiment of the invention.

In the drawings.

DETAILED DESCRIPTION OF THE PREFERRED EMBODIMENT

Figure 1:
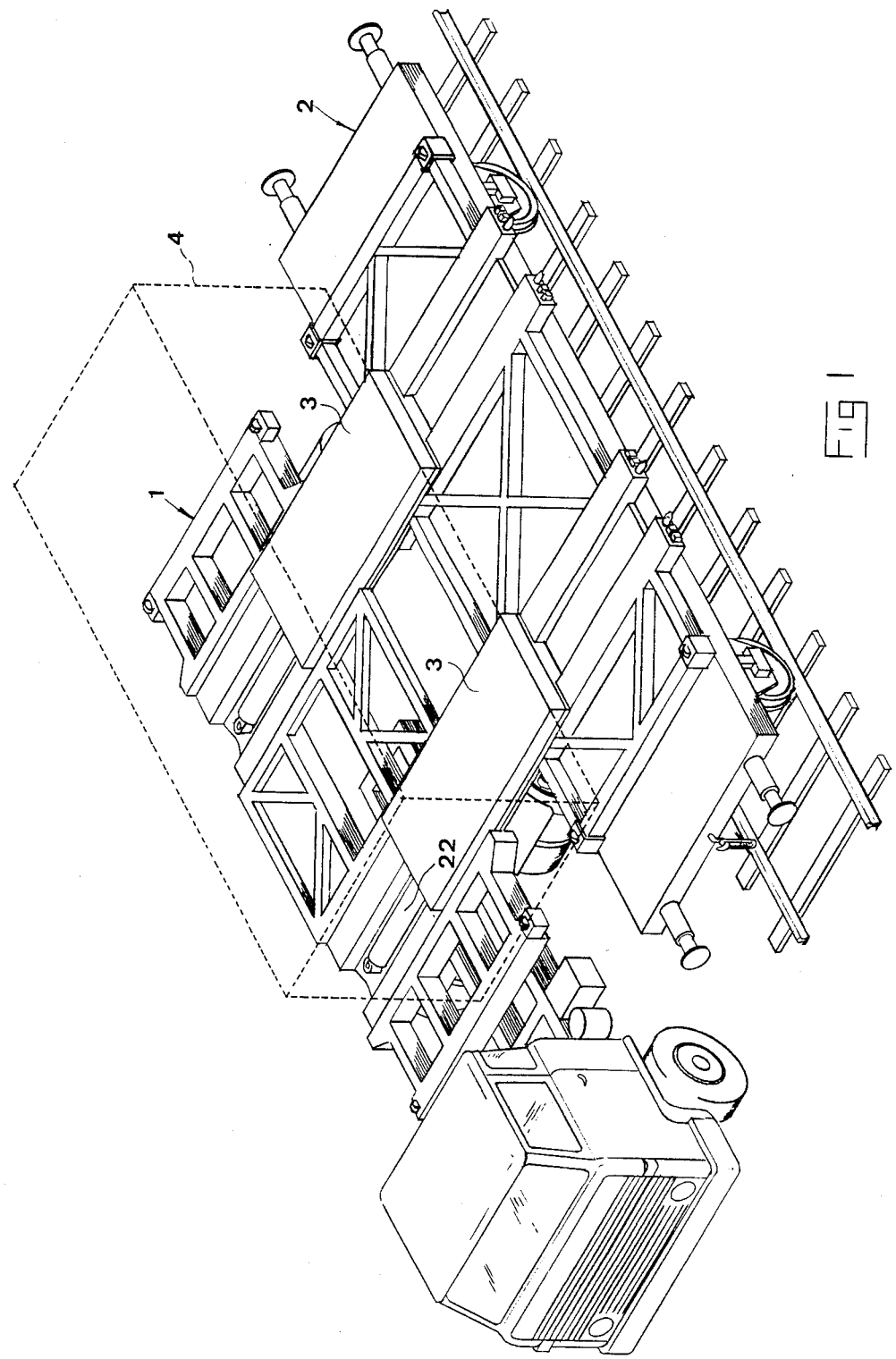
FIG. 1 is a schematic perspective view illustrating the apparatus during load transfer.

In FIG. 1, two carriers are illustrated, one carrier 1 has the character of a load carrying superstructure on a vehicle for road transport, while another carrier 2 has the character of a load carrying superstructure on a railway car. A transferring device 3 is moveable between the carriers 1 and 2 and adapted to carry a load unit 4 during the transfer. The transferring device 3 in this example is intended to normally be located on the road vehicle carrier 1 and is provided with lift devices, so that a load unit resting on carrier portions beside the transferring device 3 can be lifted up and in the elevated state transported over to the other carrier and is there lowered and supported by carrier portions beside the transferring device. Conventional locking devices can be used in order to keep the load unit, for instance a container, in a defined position on the respective carrier during transport.

Figure 6:
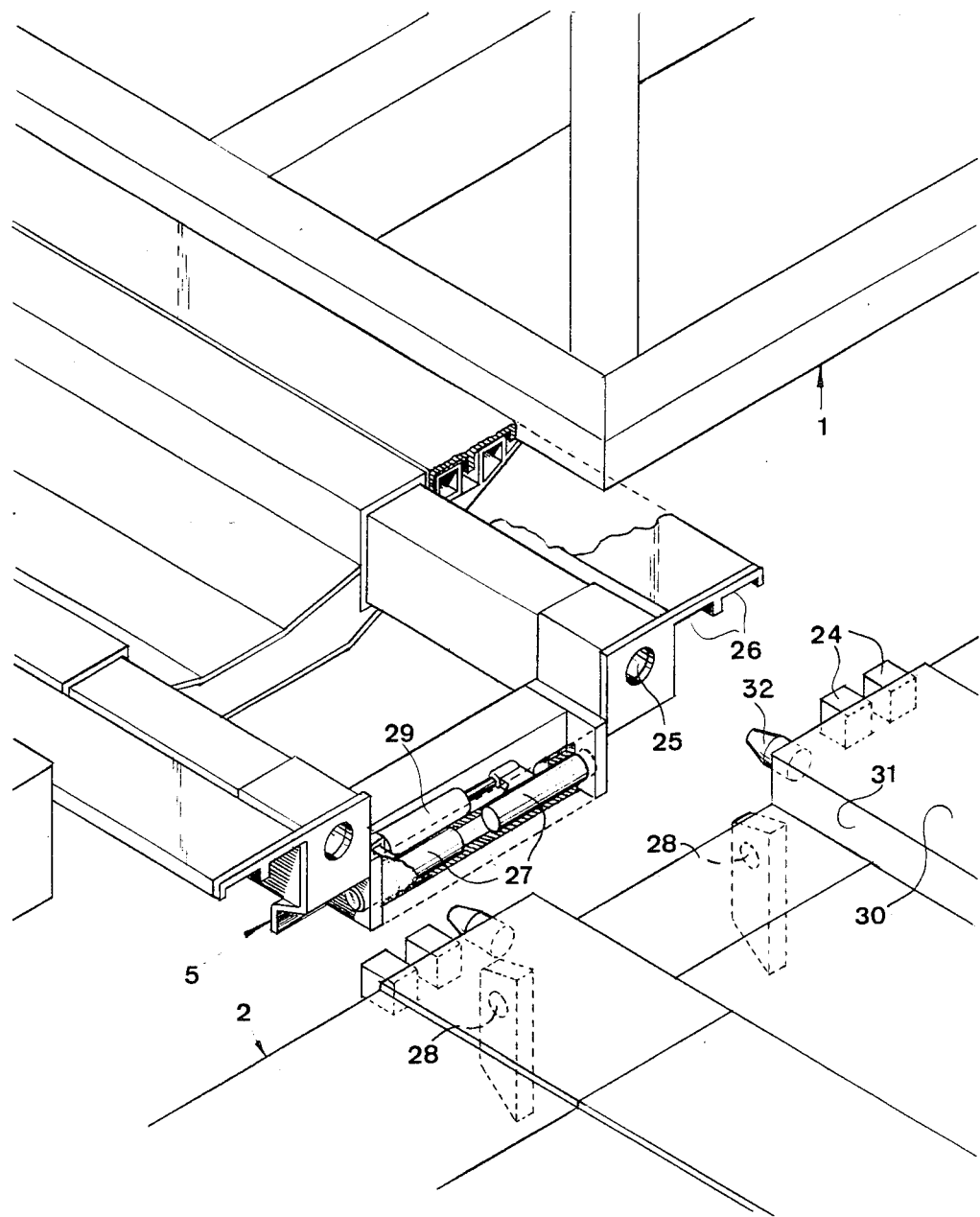
FIG. 6 is an enlarged view of a detail in FIG. 2.

A bridging device 5, which is formed in order to be movable to bridge the gap between the carriers 1 and 2, is arranged for each transferring device 3 on the road vehicle carrier 1. This bridging device 5 forms a part of a support path device 6 for supporting the transferring device 3 during its movement and it has support path portions 7, which, when the bridging device 5 is moved into a bridging position, are located in over-lapping relation, in the direction of movement of the transferring device, to further support path portions 8, which are fixed on the carrier 1, while forming a path supporting the transferring means 3, which is not shown in FIGS. 2 and 6, during its substantially entire movement from the carrier 1 to the carrier 2. The support path portions 7 on the bridging device 5 are located generally in the same horizontal plane as the support path portions 8 on the carrier 1. The bridging device 5 has at least one male member beam 9, which is displaceably received in a female member 10 on the carrier 1. The top side of the female member 10 forms the support path portions 8 on the carrier 1. The support path portions 7 of the bridging device 5 are constituted by a plate like part extending on a plane parallel with the direction of movement of the transferring device 3, said plate like part being displaceably moveable on underlayer parts 12 on the carrier 1.

In practice the bridging device 5 has two male beam members 9, which are received in two female members 10 arranged on the carrier 1. The members 9, 10 consist of boxgirders with a generally rectangular cross section. The female members 10 are disposed beside each other in a spaced relation while defining a channel 13 located therebetween.

The bridging device 5 has two plate parts 11 disposed outside the male members 9. The underlayer parts 12 consist, for example, of two sets, each set is composed of two beams (see also FIGS. 4 and 5) extending in a transverse direction of the carrier 1, the two beams are located in a spaced relation to each other and at a distance from the adjacent female beam members 8 on the carrier 1 and the adjacent transverse beams 14. The transverse beams form limits for the support path of the transferring device in the longitudinal direction of the carrier 1. Guiding portions 15 of the plate parts 11 protrude downwardly into spaces between the beams 12 and the adjacent beams 8, 14. The device 5 has a transverse, stabilizing connection 16 at the outer end.

Figure 4:
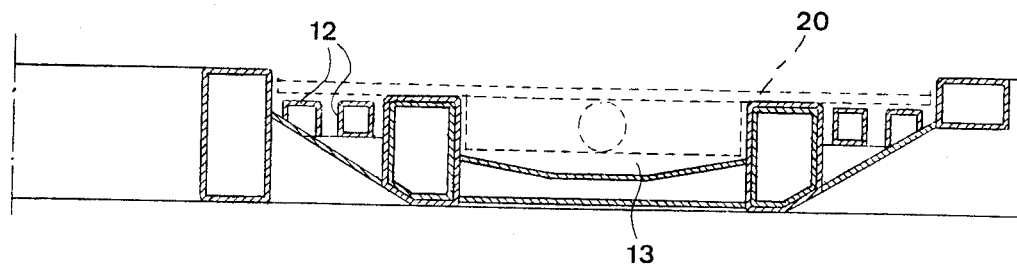
FIG. 4 is a cross sectional view along the line IV—IV in FIG. 2.
Figure 5:
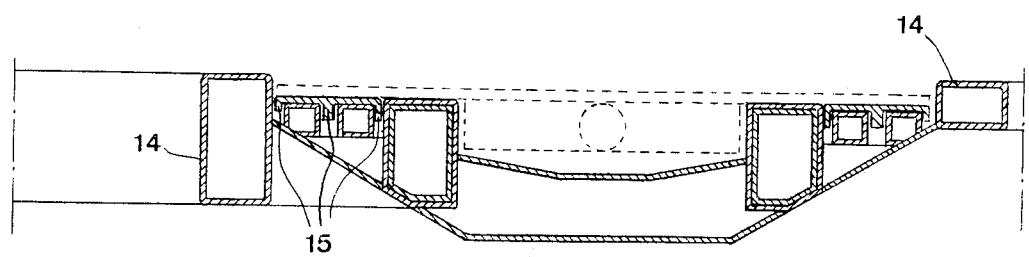
FIG. 5 is a cross sectional view along the line V—V in FIG. 2.

When the bridging device 5 is drawn back to the carrier 1 the plate parts 11 cover the underlayer beams 12 completely. The fixed support path portions 8 on the carrier 1 have unequally wide parts 17 and 18. The width of the part 17 is substantially as great as the sum of the width of the part 18 and the surface 7. The plate parts 11 forming the two support surfaces 7 are always intended to be in over-lapping relation, in the longitudinal direction of the transferring device, to the support path parts 18, whereas the over-lapping is reduced when the bridging device 5 is extended outwardly from the carrier 1 as is shown in FIGS. 4–5. Though an overlapping relation always remains, the support path portions 7 and the support path parts 17 and 18 will form a support path continuous in the direction of movement of the transferring device.

The movement back and forth of the bridging device 5 in the transverse direction of the carrier 1 is caused by two power means 19, only the one of which appears and which are designed as cylinders. The cylinders are disposed inside the female beam members 10 and at between the male beam members 9 and attachments relative to the carrier 1.

The transferring device 3 has the character of a slide having a plate like part 20, which is intended to rest in a slidable manner on the support path portions 7 and 8 with its edge portions. The lift device of the transferring device 3 is formed as a cushion device 21, which can be brought into an expanded lift state and a contracted inactive state by filling and venting respectively pressurized fluid (compare FIGS. 3 and 4). In order to cause movement of the transferring device 3 a power means 22 is provided, which is indicated in the form of a cylinder, one end 23 is fixed to the carrier 1 (see FIG. 2) and a second end is fixed to the transferring device 3 at its end facing in the opposite direction away from the fixing place 23. The power means 22 can extend below the plate 20 and be received in the channel 13.

Figure 2:
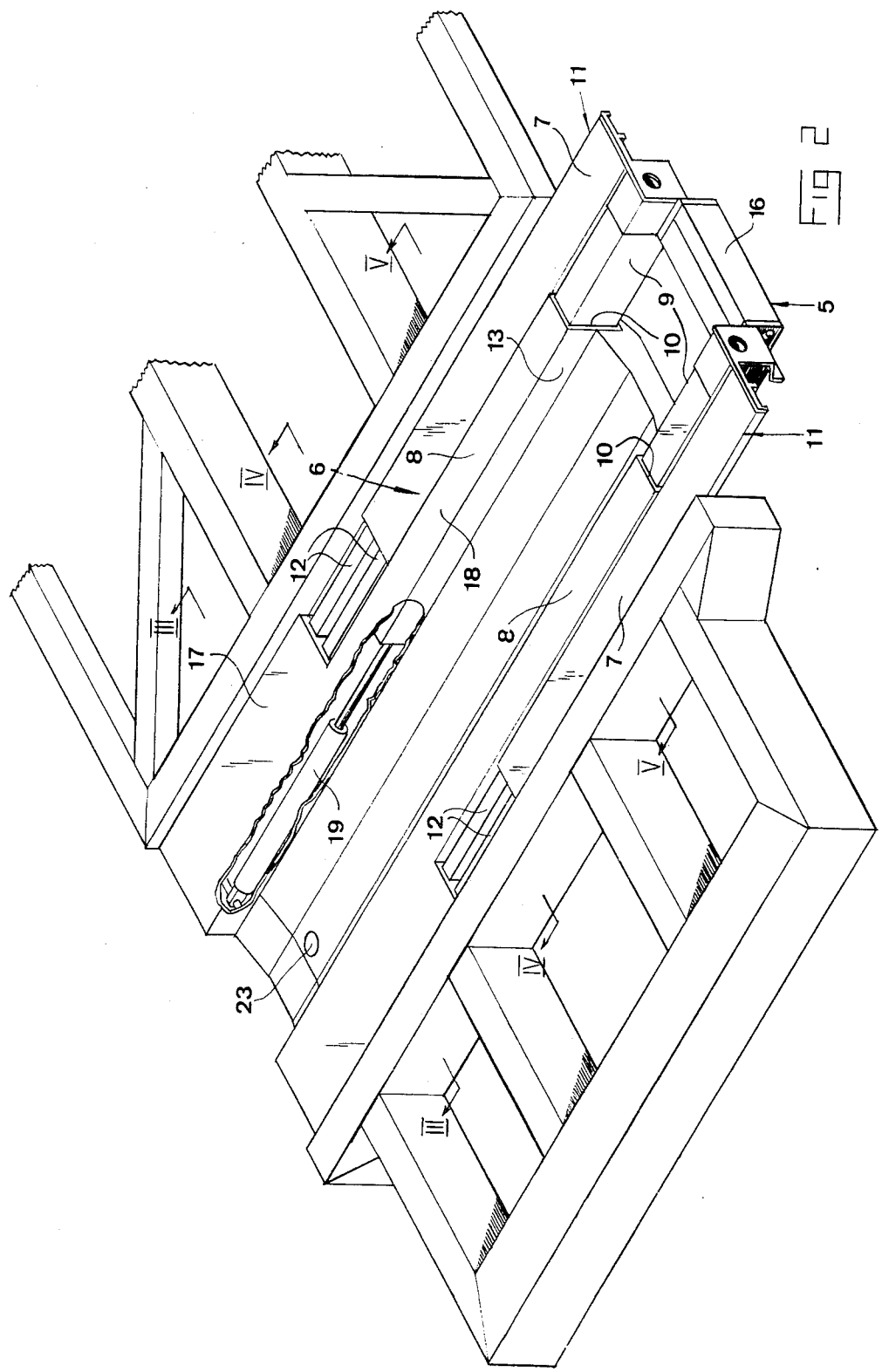
FIG. 2 is an enlarged, partly sectioned view of one of the carriers in FIG. 1.
Figure 3:
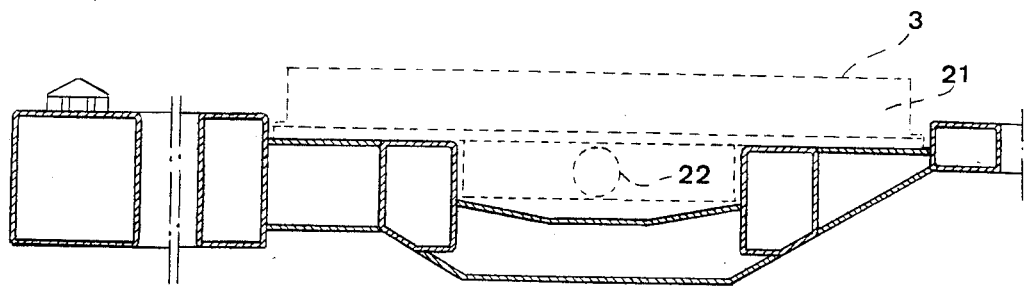
FIG. 3 is a cross sectional view along the line III—III in FIG. 2.

As appears from FIG. 3 the transferring device 3 is supported by the support parts 17 in the region of the section III—III in FIG. 2. At the section IV—IV the underlayer beams 12 do not give any support, but the supporting function does instead come from the support parts 18 of the beams 10. At the section V—V the transferring means is supported by the support parts 18 as well as the support path portions 7. Outside the beams 10 the transferring means gets support only by the support part portions 7.

The carrier 2 and the bridging device 5 have engagement means (see FIG. 6) 24–26 and 32, which co-operate in order to avoid relative movement between the carriers in the vertical plane. Said engagement means are adapted to automatically engage with each other at the movement of the bridging device away from the first carrier 1. When the male members 9 of the bridging device are telescopically guided in the beam 10 of the carrier 1, the device 5 resists deviations in the vertical plane relative to the carriers 1. Through the engagement means 24–26 and 32 a transfer of load from the bridging device 5 to the carrier 2 is obtained. The engagement means can more exactly have the character of engaging recesses and projections respectively, which face in the directions of movement of the transferring device 3.

The carrier 2 and the bridging device 5 have locking means 27, 28, the means 27 of which consist of locking pins movable by means of a power means 29 substantially in the horizontal plane and across the direction of movement of the transferring means, while the locking means consist of holes for receiving of the locking pins. When the pins 27 are led into the holes 28, movement of the bridging device 5 away from the carrier 2 is prevented.

When the bridging device 5 is extended and locked to the carrier 2 the support path portions 7 of the device 5 will be located level with transversal support path portions 30 disposed on the carrier 2, which portions 30 define a channel 31, corresponding to the channel 13 on the carrier 1, between each other.

Thus, when using the apparatus one can, after having pushed out the bridging device 5 and fixed the same to the carrier 2, push the transferring device 3 to and fro between the carriers 1 and 2, while the transferring device securely supported during its whole displacement movement.

Of course the apparatus can be modified within the scope of the idea of the invention. The transferring device may be adapted to slide on the support path portions 7 and 8, having rolling components arranged either on the transferring device 3 or on the support path portions 7 and 8 or both. The support path portions 7 and 8 need not be plane as illustrated, but they may be formed as or present rails or tracks or the like. Although it is most suitable to form the transferring device 3 to accompany that carrier, which the bridging devices are intended to accompany, it would be thinkable that the transferring device would accompany the second carrier. The number of transferring devices 3 can vary in the range from a single one and in the rising direction. The parts 11 may also have the character of beams.

I claim:

1. An apparatus for transferring a load unit across a gap between two carriers each having a top portion and at least one side portion comprising:
   at least one transferring device for supporting said load unit, said at least one transferring device movable between said two carriers;
   means for supporting said at least one transferring device mounted to one of said two carriers, said means for supporting comprising,
   a pair of female members spaced apart to form a first channel therebetween, each of said pair of female members having a top surface extending along a generally horizontal plane defining a first support path portion for supporting said load unit on said one carrier and having a box girder cross section defining an enclosed channel,
   a pair of underlayer members, each of said pair of underlayer members mounted adjacent to a respective one of said pair of female members,
   means for bridging the gap between said two carriers extensible between a retracted position on said one of said two carriers and a bridging position in abutting contact with a side portion of said other of said two carriers, said means for bridging comprising, a pair of male members, each of said pair of male members having a cross section complementary with said box girder cross section and adapted to be slidably received within said enclosed channel of a respective one of said female members, said pair of male members being telescopically extensible from said enclosed channel between said retracted position and said bridging position, and said means for bridging supporting and guiding said transferring device over said gap when in said bridging position, means for extending said pair of male members from said enclosed channel, said means for extending mounted to said one of said two carriers and cooperating with said pair of male members for slidably moving said pair of male members between said retracted position and said bridging position, a pair of plate members, each of said pair of plate members mounted to a respective one of said pair of male members and extending along said generally horizontal plane to form a second path portion, each of said pair of plate portions supported by a respective one of said pair of underlayer members, said second path portion being adapted to support said transferring device when said means for bridging is extended in said bridging position; and means for moving said transferring device and said load unit between said two carriers when said means for bridging is in said bridging position, said means for moving positioned in said first channel and having an end portion mounted to said one of said two carriers and another end mounted to said transferring device for moving said transferring device and said load unit along said first and second paths between said two carriers.

2. An apparatus as claimed in claim 1 wherein each of said pair of underlying members further comprises: two girders spaced apart to form a space therebetween; and wherein each of said pair of plate members further comprise a support portion extending downwardly from each of said pair of plate members into said space between said two girders.

3. The apparatus of claim 1 further comprising:
a connecting member extending between an outer end of each of said pair of male members, such that said pair of plate members define upright portions of a U-shape and said connecting member defines a base of said U-shape when said means for bridging is in said bridging position and viewed from above.

4. The apparatus as claimed in claim 3 further comprising:
means for engagement with said means for bridging to prevent relative movement between the two carriers on a vertical plane, said means for engagement mounted to said side portion said other of said two carriers.

5. The apparatus as claimed in claim 4, comprising;
means for automatically connecting said means for bridging to said other carrier when said means for bridging abuts said other carrier.

6. The apparatus as claimed in claim 4 further comprising:
means for locking said means for bridging to said other carrier, said means for locking comprising a pair of pins movable along a longitudinal axis of said connecting member to lock each a respective one of each of said pair of male members to said means for engagement of said other carrier.

* * * * *

UNITED STATES PATENT AND TRADEMARK OFFICE
CERTIFICATE OF CORRECTION

PATENT NO. : 4,783,190

DATED : 11/8/88

INVENTOR(S) : Sten Lovgren

It is certified that error appears in the above-identified patent and that said Letters Patent is hereby corrected as shown below:

```
Col. 1, line 56, delete "so";

Col. 3, line 29, delete "at" and insert --act--;

Col. 4, line 24 after "device", insert --is--.
```

Signed and Sealed this

Twenty-eighth Day of March, 1989

*Attest:*

DONALD J. QUIGG

*Attesting Officer*   Commissioner of Patents and Trademarks